United States Patent [19]
Goodell

[11] Patent Number: 5,327,346
[45] Date of Patent: Jul. 5, 1994

[54] AUTOMATIC CONTROL FOR CENTRAL TIRE INFLATION SYSTEM

[75] Inventor: Fred L. Goodell, Marysville, Ohio

[73] Assignee: Harsco Corporation, Wormleysburg, Pa.

[21] Appl. No.: 749,172

[22] Filed: Aug. 23, 1991

[51] Int. Cl.$^5$ .................. B60C 23/00; B60C 23/02
[52] U.S. Cl. .................. 364/426.02; 340/442; 340/444; 73/49; 73/146.2; 152/416
[58] Field of Search .................. 340/442, 444; 364/426.02, 558, 565; 180/197; 137/224; 73/49, 146.2; 152/416, 417, 427

[56] References Cited

U.S. PATENT DOCUMENTS

| | | | |
|---|---|---|---|
| 3,102,573 | 9/1963 | Van Winsen et al. | 152/416 |
| 4,154,279 | 5/1979 | Tsuruta et al. | 152/416 |
| 4,418,737 | 12/1983 | Goodell et al. | 152/416 |
| 4,431,043 | 2/1984 | Goodell et al. | 152/417 |
| 4,570,691 | 2/1986 | Martus | 152/427 |
| 4,619,303 | 10/1986 | Bryan et al. | 152/416 |
| 4,640,331 | 2/1987 | Braun et al. | 152/417 |
| 4,640,331 | 2/1987 | Braun et al. | 152/417 |
| 4,724,879 | 2/1988 | Schultz et al. | 152/416 |
| 4,744,399 | 5/1988 | Magnuson et al. | 152/417 |
| 4,754,792 | 7/1988 | Braun et al. | 152/417 |
| 4,763,709 | 8/1988 | Scholer | 152/416 |
| 4,860,579 | 8/1989 | Beverly | 73/146.2 |
| 4,898,216 | 2/1990 | Schultz et al. | 73/146.2 |
| 4,947,332 | 8/1990 | Ghoneim | 364/426.03 |
| 5,121,774 | 6/1992 | Hicks et al. | 73/146.2 |

FOREIGN PATENT DOCUMENTS

| | | | |
|---|---|---|---|
| 0344004 | 11/1989 | European Pat. Off. | 340/444 |
| 2193172 | 2/1988 | United Kingdom | 152/417 |
| 2246461 | 1/1992 | United Kingdom | 340/444 |

OTHER PUBLICATIONS

Central Tire Inflation: A Giant Step Towards Soft Soil Mobility by Fred. L. Goodell, Society of Automotive Engineers, #881829, Nov. 1988.

Primary Examiner—Thomas G. Black
Assistant Examiner—Julie D. Day
Attorney, Agent, or Firm—Kerkam, Stowell, Kondracki & Clarke

[57] ABSTRACT

A central tire inflation system for controlling the tire inflation pressure of a driven wheeled vehicle includes a compressed air source connected through a conduit system with the vehicle tires, a controllable valve system connected in the conduit system and a tire pressure controller connected with and controlling operation of the valve system to selectively increase or decrease inflation pressure includes wheel slip detectors and a vehicle speed detector for generating a signal proportional to detected slippage rate and vehicle speed, and signal processing system for utilizing the slippage signal and vehicle speed signals to control the valve system to automatically control tire inflation pressure in response to conditions encountered to minimize slippage and maintain tire inflation pressure at the highest pressure commensurate with safety and economic operation.

10 Claims, 2 Drawing Sheets

AUTOMATIC CONTROL FOR CENTRAL TIRE INFLATION SYSTEM

BACKGROUND OF THE INVENTION

1. Field of the Invention

This invention relates to central tire inflation systems for motor vehicles and more particularly to such a system for automatically regulating pressure in the vehicle tires in response to conditions encountered during operation of the vehicle.

2. Description of the Prior Art

It is well known that traction of a vehicle's pneumatic tires may be varied by varying the inflation pressure. By decreasing the inflation pressure, the resulting increase in area of contact between the tire and its support surface (the tire footprint) produces a corresponding increase in traction, enabling operation over soft terrain such as in mud or sand, or on slippery surfaces such as snow or ice. Reduced inflation pressure results in increased rolling friction and may also result in increased tire temperatures, however. Therefore for maximum handling ability and for economic reasons it is desired to maintain tire pressure at the highest suitable pressure during operation at higher speeds and on smooth road surfaces.

Various central on board systems, generally referred to as central tire inflation systems, or CTIS, have been provided in the past for adjusting the tire inflation pressure while the vehicle is in operation. A CTIS is now considered standard equipment on many vehicles such as many types of military trucks which must operate reliably both on and off the road. The development of the CTIS for such military use is discussed in the SAE Technical Paper, Series 881829, entitled "A Giant Step Toward Soft Soil Mobility", by Fred L. Goodell, and a schematic of a CTIS now in use on many military vehicles is illustrated in that paper. Other known central tire inflation systems, and components for use in such systems, are disclosed in U.S. Pat. Nos. 3,102,573 to Van-Winsen et al; 4,154,279 to Thuruta; 4,431,043, and 4,418,737 to Goodell; 4,619,303 to Brian et al; 4,640,331 and 4,754,792 to Braun et al; 4,724,879 to Schultz et al; and 4,860,579 to Beverly.

The current state of the art CTIS employs a semi-automatic control wherein the vehicle driver may actuate a preselected switch depending upon the nature or condition of the surface being driven over, and the system will automatically adjust and maintain the tire inflation pressure at a level compatible with the selected condition. In the system schematically shown in the SAE paper, the driver may select between the HIGHWAY mode in which CTIS will automatically maintain the tire inflation pressure at the recommended high pressure, for example 60 psi, for high speed highway travel, the CROSS COUNTRY mode in which the tire pressure is maintained at 35 psi for travel over open terrain, the SAND or MUD mode in which tire pressure is maintained at 25 psi, and an EMERGENCY mode in which the pressure is reduced to 12 psi. During operation, the system periodically (every 15 minutes) checks pressure in the tires and makes adjustments as necessary to maintain the pressure corresponding to the selected mode. This system also provides for more frequent pressure sensing and includes an automatic reset for returning the pressure from the EMERGENCY mode to the SAND mode after a predetermined time.

One problem with the known systems has been the requirement for driver monitoring and manual selection of the desired mode of operation. While this has generally been satisfactory for routine missions or when operating under a single condition throughout a mission, it has not been satisfactory where frequent operating condition changes are encountered or when operating under hostile conditions in that the driver could sometimes forget to shift the system from one mode to another when encountering different driving conditions. For example, if the vehicle goes from a sand condition onto a highway and commences travelling at high speed without resetting the CTIS, the low SAND or CROSS COUNTRY mode tire pressure can result in overheating and ultimate failure of the tires. Similarly, when suddenly entering soft sand or mud, momentum can be lost and the vehicle stalled for failure to promptly reduce tire pressure. It is, accordingly, a primary object of the present invention to provide an improved CTIS which will promptly and automatically select the proper operating mode or tire pressure depending upon driving conditions encountered.

Another object is to provide such a CTIS which will automatically select and maintain the desired tire inflation pressure to minimize or eliminate slippage between the vehicle tires and the supporting road surface.

Another object is to provide such a CTIS which will automatically adjust the tire inflation pressure in response to a change in slippage between the tire and the road surface.

Another object is to provide such a CTIS which senses tire slippage and automatically adjusts tire inflation pressure in response to the sensed slippage.

Another object is to provide a method of operation of a vehicle which includes monitoring the slippage between the vehicle's pneumatic tires and the road surface, and adjusting the inflation pressure as necessary to minimize such slippage while maintaining the inflation pressure at its highest pressure commensurate with safety and economic operation.

Another object is to provide such a method which utilizes a wheel slip sensor of the same type as the anti-lock braking system (ABS) which provides a signal to the CTIS on board computer which computer continuously monitors slip and automatically selects the proper inflation pressure corresponding to the vehicle speed and slip condition.

SUMMARY OF THE INVENTION

In the attainment of the foregoing and other objects and advantages of the invention, an important feature resides in providing sensing means for continuously sensing slippage of the vehicle's driven wheels and providing a signal responsive to such slippage to the on board computer for controlling the CTIS. Known slip sensing means of the type employed, for example, on anti-lock braking systems may be employed to sense wheel slippage, and where the vehicle is equipped with an ABS system, the same slip sensors may be employed to send a signal to the CTIS on board computer.

A signal corresponding to the engine (vehicle) speed is also fed to the computer. When the computer senses a slip condition which is excessive, a dead time, or time delay is activated during which time the slip condition is continuously monitored to be sure that it is not a transient condition. If excessive slip continues after lapse of the dead time, the computer signals the CTIS to reduce the tire inflation pressure one increment, for example, from 60 to 45 psi. At the same time, an overspeed warning is energized to provide a visual signal to the operator when the vehicle speed exceeds the safe limit for the reduced tire pressure, for example, 45 mph.

If the first tire pressure reduction allows the system to stabilize with no slip (or an acceptable low slip) being sensed, the system will hold at this pressure for so long as the vehicle speed remains below the maximum safe speed for that pressure. When the overspeed signal generator indicates that the vehicle speed has exceeded the safe (45 mph) speed for the 45 psi tire pressure for a predetermined time, the computer will then signal CTIS to increase tire pressure back to the original 60 psi pressure safe for 55 mph operation.

If the slip sensor continues to sense slip after tire pressure has been reduced to 45 psi for a second dead time, the system will automatically reduce the tire pressure to the 35 psi level and reset the overspeed warning system to 35 mph. If slip still shows after passage of a third dead time, the system will reduce the tire pressure to the 25 psi level and reset the overspeed warning system to 25 mph. Finally, if the slip condition persists after a fourth dead time, tire pressure will be reduced to the emergency mode of 12 psi and the overspeed warning system will be reset to 10 mph.

Due to the fact that tires tend to heat excessively at the emergency pressure, a timer is provided in the computer to limit the time the tire pressure can remain at 12 psi, after which time the pressure will automatically be increased to 25 psi. A manual override, or timer reset, is provided, however, to enable the operator to extend the time at emergency low pressure in the event of very deep soft sand, snow or mud, or in an emergency combat situation. Acceleration of the vehicle without encountering excessive slippage for a set time to a speed above the speed safe for any tire pressure setting will result in the speed signal generator increasing the pressure to the next higher setting until finally the maximum safe tire pressure is reached. The condition at highway pressure will then continue until the slip sensor shows evidence of slip And the cycle is repeated.

BRIEF DESCRIPTION OF THE DRAWINGS

Other features and advantages of the invention will be apparent from the detailed description contained hereinbelow, taken in conjunction with the drawings, in which.

DESCRIPTION OF THE PREFERRED EMBODIMENT

Figure 2:
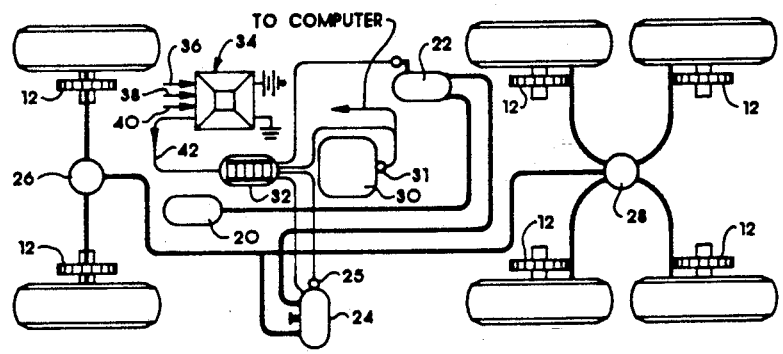
FIG. 2 is a schematic illustration of the pneumatic tire pressure control system according to the present invention.

Referring now to the drawings, the invention will be described with reference to a front engine, all wheel drive vehicle such as a military truck indicated generally by the reference numeral 10. As is explained in detail in U.S. Pat. No. 4,947,332, when power is supplied to a driven wheel of a vehicle, the wheel accelerates at a rate $\alpha$ and commences rotating at a speed $\omega$. Under normal conditions, the vehicle normal force, $F_n$, and the wheel/road tractive force, $F_\mu$, in combination with the driving torque of the engine present at the wheel, cause the vehicle to move at a velocity V. The relative difference between the speeds of the wheel and of the vehicle is called slip, and is measured as $\lambda = (V - \omega)/V$. This relationship is utilized in commercially available slip detectors or sensors of the type conventionally employed in anti-skid braking systems and are indicated generally by the reference number 12 in the schematic showing of FIG. 2.

Figure 3:
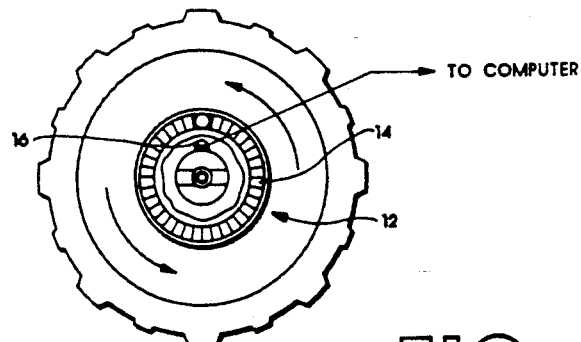
FIG. 3 is a schematic illustration of a slip detector suitable for use in detecting wheel slip.

Referring to FIG. 3, slip sensors 12 generally consist of a slotted disc 14 attached to the wheel hub of a vehicle axle shaft, with a permanent magnet 16 mounted in fixed position in such a way that it just clears the disc. As the slot in the disc approaches and passes the magnet, the magnetic flux increases rapidly, then decays as the slot turns away from the magnet. These pulses thus provide an accurate measurement of wheel speed which can be fed to the computer where wheel speed is compared with the vehicle speedometer or tactometer and the formula of vehicle speed is computed to provide the necessary wheel speed $(V - \omega)$ divided by vehicle speed (V) indicating slip.

Figure 4:
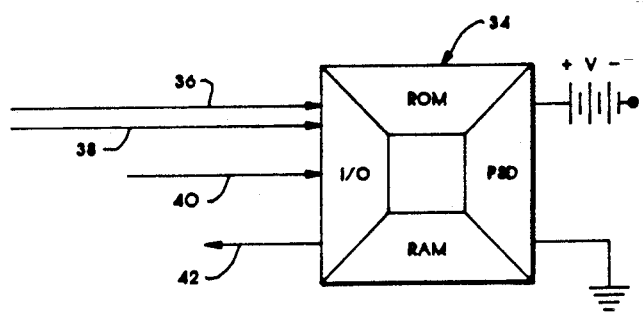
FIG. 4 is a schematic illustration of a digital computer utilized in controlling the vehicle central tire inflation system in accordance with the invention.

Referring again to FIG. 2, the vehicle 10 comprises an on board air compressor 20 which supplies air to an air dryer and storage tank 22 which, in turn, is connected to a pneumatic control valve assembly 24 located in the vehicle cab. The controls 24 are connected, through a conduit system and a first exhaust valve 26, to the vehicle's front wheels and through a second exhaust valve 28 to the vehicle's rear wheels to supply inflation air to the pneumatic tires. Other pneumatic systems such as for the brakes which are connected to the pneumatic controls 24 are not shown for simplicity. A speed transducer 30 mounted on the vehicle transmission is operatively connected with the vehicle speedometer or tachometer 31 which provides a signal corresponding to vehicle speed to the CTIS electronic control 32 and to the on board digital computer 34 as shown in FIG. 4. A pressure transducer 25 connects the control valve assembly 24 to the CTIS control 32.

Computer 34 may be a digital computer having inputs 36, 38 from the front and rear slip sensors 12, and an input 40 from the speed transducer 30, which signals are interfaced through the I/O. The computer also includes a power supply device (PSD) that interfaces to the vehicle power system, a read-only memory (ROM) which contains the instructions necessary to perform the algorithm embodying the subject inventive concepts, a random-access memory (RAM) used for storing computational results and calculation variables, and a central processing architecture embodying the CPU that controls the execution of instructions from the ROM, storing data in the RAM, reading and transmitting information through the I/O, and other functions of the computer to produce an output signal 42 to the CTIS control 34. The use of such a digital computer in a spin or slip control system for a motor vehicle is disclosed and described in the above-identified U.S. Pat. No. 4,947,332, which patent also includes an explanation of vehicle wheel slip, and the disclosure of the patent is incorporated herein by reference.

Figure 1:
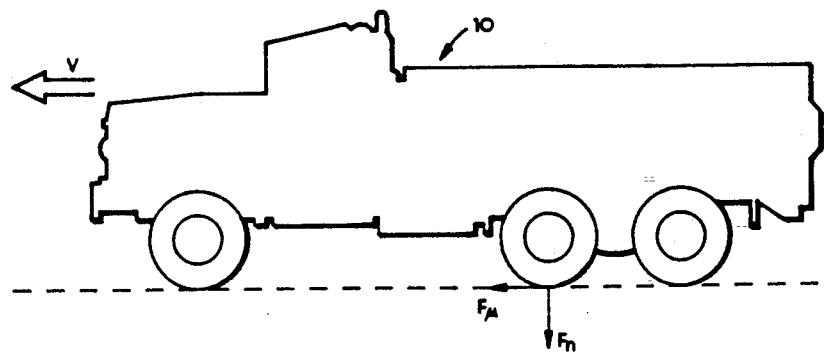
FIG. 1 is a schematic diagram of a motor vehicle and its dynamics.
Figure 5:
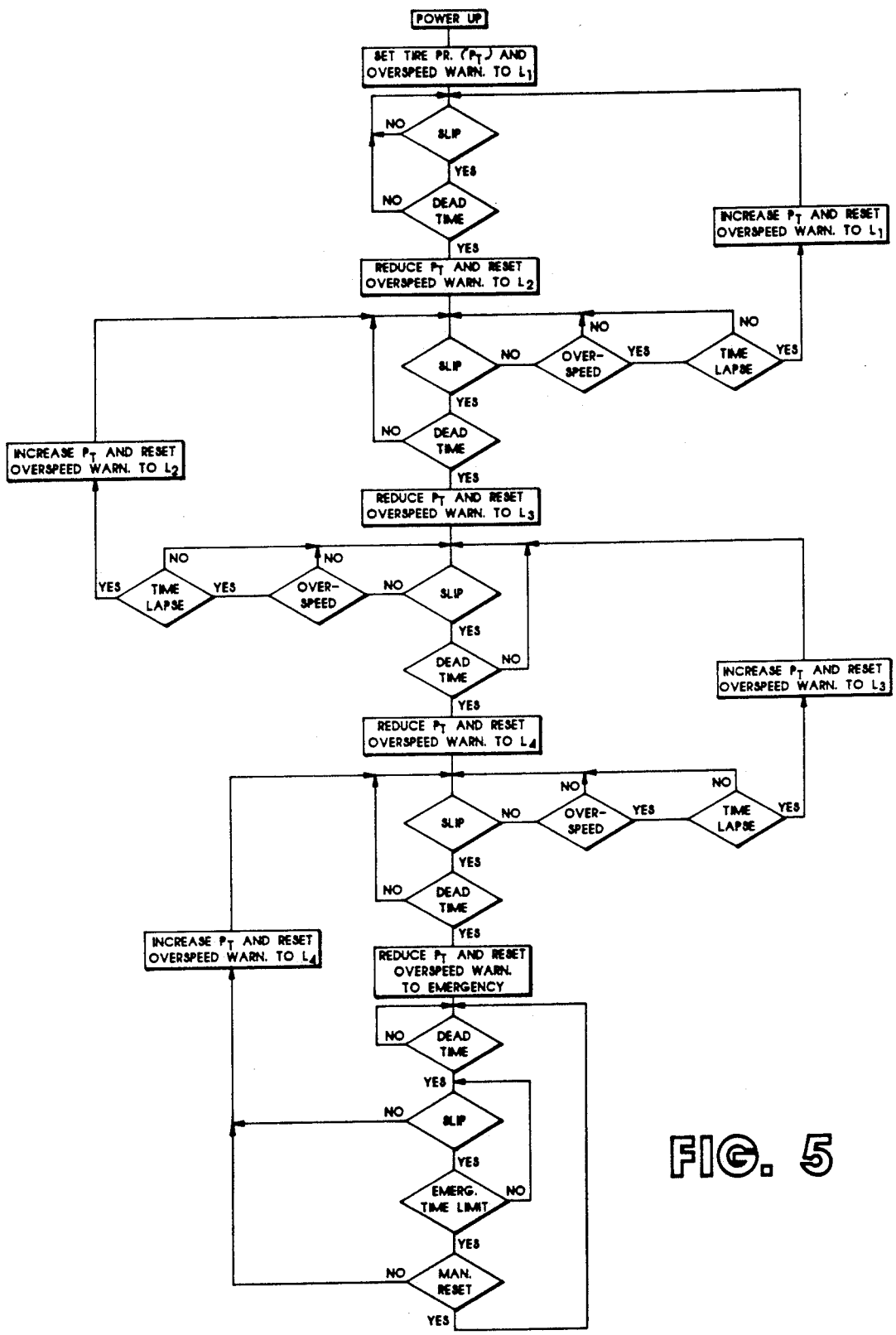
FIG. 5 is a computer flow chart illustrating a preferred embodiment of the invention.

FIG. 5 is a general flow chart summarizing the operation of a digital computer embodying the invention, it being understood that devices other than a digital computer may be employed to accomplish the various functions. Thus, when the computer 34 is powered up, as upon ignition of the vehicle engine, the system is initially set for normal road operation, which setting may be referred to as the first level or L1 condition. For example, for a 5-ton military truck of the type schematically illustrated in FIG. 1, tire pressure ($P_t$) may be set at 60 psi and the vehicle overspeed warning system set for 55 mph at the L1 setting. At this setting, speeds in excess of 55 will flash a warning light in the vehicle cab.

As the vehicle commences movement over the road, the wheel slip sensors from the front and rear wheels (assuming both front and rear wheels are driven) provide slip signals fed as inputs to the computer. If slip is within acceptable limits, no change is made and the vehicle continues to operate under the conditions initially set. If slip is encountered which is greater than the minimum acceptable, a time delay or dead time timer is activated and if the excessive slip condition persists after expiration of the dead time, the computer produces a signal to the CTIS control to reduce $P_t$ to the cross country level, indicated as L2 in FIG. 5, and simultaneously resets the overspeed warning detector to the cross country speed, e.g. 45 mph.

When the tire pressure and wheel speed have stabilized at the cross country or L2 level, the slip detectors will continue to feed their signals to the computer and if no excessive slip is detected, the system will stabilize and $P_t$ will remain at the 45 psi L2 level. If the overspeed warning system indicates the speed of the vehicle is in excess of the 45 mph for the 45 psi L2 pressure, however, and this overspeed continues beyond a predetermined lapse of time, the computer will automatically return the tire pressure $P_t$ to the L1 level for highway travel and simultaneously reset the overspeed warning to 55 mph L1 level. Conversely, if excessive slip is still detected after $P_t$ has stabilized at the L2 level, a dead time will again be initiated and if excessive slip continues after lapse of the dead time the, $P_t$ will be further reduced to L3 or 35 psi and the overspeed warning will be reset to the 35 mph L3 level.

When the CTIS has reduced $P_t$ to the L3 level and reset the overspeed warning light to the corresponding speed, the above sequence of steps will be repeated with the result that, if slip is within acceptable limits and the vehicle is not operated at excessive speeds for this P3 level, the system will stabilize and continue to operate at the L3 level. However, if the vehicle speed Vs is increased and maintained at a rate above 35 mph for a predetermined time, the computer will again automatically signal the CTIS to increase $P_t$ to the next higher (L2) level and to reset the overspeed warning correspondingly. Conversely, if slip persists at the L3 level, after the lapse of a set dead time, the $P_t$ will be further reduced to L4 or 25 psi and overspeed warning system will be reset to the corresponding 25 mph level. Again, the same sequence of steps will be repeated with the result that the tire pressure will either be stabilized at the L4 level, increased to the L3 level after a predetermined time as a result of excessive vehicle speed, or if slip persists, further reduced to the emergency 12 psi level after lapse of a predetermined dead time.

When the $P_t$ is reduced to the emergency level of 12 psi (L5) and the overspeed warning is reset to the corresponding safe level of 10 mph, a dead time is initiated. If no slip is detected after lapse of the dead time, the computer will signal the CTIS to increase $P_t$ to the L4 level and reset the overspeed warning accordingly. However, if slip persists at the emergency level, an emergency time limit will be initiated. After lapse of the emergency time limit, the computer will signal the CTIS to return the tire pressure to the L4 level regardless of slip conditions; however, a manual reset is connected in the system to enable the vehicle operator to reset the system to continue at the emergency $P_t$ level through another emergency time limit. The manual reset can be utilized as many times as desired or required by the emergency conditions. As in the other conditions described above, if the vehicle is operated at a speed above L5 overspeed setting for a predetermined time, the computer will signal the CTIS to increase the pressure to the L4 level of 25 psi and the computer will automatically repeat the above-described steps until the vehicle speed and tire pressure reach a stable condition.

It is pointed out that the overspeed sensing and warning system automatically prevents operation of the vehicle for extended periods at speeds in excess of that safe for the tire inflation pressure. This system does not reduce the tire pressure, however, when vehicle speed is reduced; instead, only slip conditions extending beyond a dead period will result in tire pressure reduction.

While the system described above is fully automatic, with the exception of the manual override in the emergency mode, the invention may readily be adapted for use in a CTIS system of the type described, for example, in the above-mentioned SAE technical paper wherein the system includes a manually operated mode selector enabling the operator to manually select a condition under which the vehicle could normally be expected to operate throughout a mission. In such a system, if the operator selected the highway operating mode, the present invention would take over and control operation throughout the full range of its capabilities; however, if the operator selected a different mode, for example, a cross country mode as where the vehicle may be expected to operate for an extended period in an off the road campaign, the present invention would continue to operate in the same manner with the exception that the maximum tire pressure for high speed highway travel would not be achieved. Other features of the prior art system, such as the run flat mode, may also readily be incorporated into a system embodying the present invention. Thus, while a preferred embodiment of the invention has been disclosed, it should be apparent that the invention is not limited to the disclosed embodiment but rather that it is intended to include all embodiments which would be apparent to one skilled in the art and which come within the spirit and scope of the invention.

What is claimed is:

1. In a central tire inflation system for controlling the inflation pressure in the tires of a driven wheeled vehicle, the system including a source of compressed air, conduit means connecting the source of compressed air with each of the vehicle wheels, valve means connected in the conduit means, and valve control means connected with the valve means and operable to actuate said valve means to selectively establish fluid communication with the source of compressed air to increase inflation pressure and to vent the tires to atmosphere to decrease inflation pressure, the improvement comprising, slip detection means operatively associated with each driven wheel of the vehicle, said slip detection means being operable to detect the slippage rate of the vehicle's driven wheels to generate a slippage signal proportional to the detected slippage rate, speed detecting means for detecting vehicle speed and providing a speed signal proportional to the detected vehicle speed, calculating means connected with said slip detecting means, said speed detecting means and said valve control means, said calculating means being operable to process the speed signal and slippage signals to produce a signal to said valve control means upon detecting a predetermined slip rate for a predetermined time to actuate said valve means to vent the vehicle tires to reduce the pressure therein a predetermined amount.

2. The invention defined in claim 1 wherein said calculating means include means for detecting an overspeed condition based upon tire inflation pressure and producing a signal to said valve control means to actuate said valve means to inflate the vehicle tires upon determining an overspeed condition to exist for a predetermined time.

3. The invention defined in claim 2 wherein said calculating means is a digital computer.

4. A method of controlling the inflation pressure in the pneumatic tires of a wheeled vehicle having a central tire inflation system including a source of compressed air, a fluid conduit system connecting the vehicle tires to the source of compressed air, valve means connected in the fluid conduit system and selectively operable to admit air from the compressed air source to the tires to increase tire inflation pressure and to vent air from the tires to atmosphere to decrease tire inflation pressure, and valve control means operably connected with the valve means for actuating the valve means to selectively increase or decrease the tire inflation pressure and to maintain the inflation pressure at any one of a plurality of predetermined inflation pressure levels, the improvement comprising, determining the slip rate of the vehicle's driven wheels and producing a signal representative of the determined slip rate, determining the vehicle speed and producing a signal representative of the determined speed, using said slip rate signal and said vehicle speed signal to determine a desired inflation pressure level decrease and producing a pressure decrease signal, and using said pressure level decrease signal to actuate the valve means to produce the desired tire inflation pressure level decrease.

5. The invention defined in claim 4 further comprising the step of delaying actuation of the valve means for a predetermined time after determining the existence of a desired inflation pressure decrease and, determining that the desired pressure level decrease continues to exist after lapse of said predetermined time before actuating the valve means to produce the pressure level decrease.

6. The invention defined in claim 5 wherein said central tire inflation system further includes a vehicle overspeed sensing means for producing an overspeed signal in response to vehicle speed in excess of a predetermined safe speed for each predetermined tire inflation pressure level, the method further comprising the step of actuating the valve means to produce an incremental tire inflation pressure increase in response to a continuous overspeed signal for a predetermined time.

7. The invention defined in claim 4 wherein said vehicle comprises an anti-lock brake system including a slip detector mounted in association with the vehicle wheels and providing a slip signal for control of the anti-lock brake system, the improvement comprising using the slip signal from the anti-lock brake slip detectors to provide the slip signal to said central tire inflation system.

8. The invention defined in claim 7 wherein said anti-lock brake system includes an on board digital computer for processing the signal from said slip detector and for controlling operation of the anti-lock brakes, the improvement comprising using said on board digital computer for controlling operation of said central tire inflation system.

9. The invention defined in claim 8 further comprising the step of delaying actuation of the valve means for a predetermined time after determining the existence of a desired inflation pressure decrease and, determining that the desired pressure level decrease continues to exist after lapse of said predetermined time before actuating the valve means to produce the pressure level decrease.

10. The invention defined in claim 9 wherein said central tire inflation system further includes a vehicle overspeed sensing means for producing an overspeed signal in response to vehicle speed in excess of a predetermined safe speed for each predetermined tire inflation pressure level, the method further comprising the step of actuating the valve means to produce an incremental tire inflation pressure increase in response to a continuous overspeed signal for a predetermined time.

* * * * *